US007660340B2

(12) United States Patent
Mailaender

(10) Patent No.: US 7,660,340 B2
(45) Date of Patent: Feb. 9, 2010

(54) METHOD OF RECEIVER PROCESSING OF CDMA SIGNALS IN A CDMA SYSTEM

(75) Inventor: Laurence Mailaender, New York, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 936 days.

(21) Appl. No.: 10/872,359

(22) Filed: Jun. 22, 2004

(65) Prior Publication Data

US 2005/0281323 A1    Dec. 22, 2005

(51) Int. Cl.
H04B 1/00 (2006.01)

(52) U.S. Cl. ........................................ 375/147; 375/233
(58) Field of Classification Search ................. 375/136, 375/144, 147, 148, 347, 349, 229; 370/320, 370/335, 342, 441

See application file for complete search history.

(56) References Cited

U.S. PATENT DOCUMENTS

| | | | | | |
|---|---|---|---|---|---|
| 4,658,426 | A | * | 4/1987 | Chabries et al. | 381/94.3 |
| 4,939,685 | A | * | 7/1990 | Feintuch | 708/322 |
| 5,481,570 | A | * | 1/1996 | Winters | 375/347 |
| 6,912,258 | B2 | * | 6/2005 | Birru | 375/340 |
| 7,054,354 | B2 | * | 5/2006 | Gorokhov et al. | 375/148 |
| 7,075,967 | B2 | * | 7/2006 | Struhsaker et al. | 375/130 |
| 7,212,569 | B1 | * | 5/2007 | Clark | 375/233 |
| 2001/0033614 | A1 | * | 10/2001 | Hudson | 375/229 |
| 2002/0070796 | A1 | * | 6/2002 | Gay-Bellile et al. | 329/304 |
| 2003/0007554 | A1 | * | 1/2003 | Birru | 375/233 |
| 2004/0076239 | A1 | * | 4/2004 | Yu et al. | 375/260 |
| 2004/0142665 | A1 | * | 7/2004 | Papathanasion et al. | 455/101 |
| 2004/0223480 | A1 | * | 11/2004 | Nguyen et al. | 370/342 |
| 2005/0117532 | A1 | * | 6/2005 | Zhang et al. | 370/320 |
| 2005/0122947 | A1 | * | 6/2005 | Wang et al. | 370/342 |

FOREIGN PATENT DOCUMENTS

EP    1 289 182 A2    3/2002

OTHER PUBLICATIONS

Mailaender, Laurence. "Linear MIMO Chip Equalization for the CDMA Downlink." 2003 4th IEEE Workshop on Signal Processing Advances in Wireless Communications, Jun. 2003, pp. 299-303.
Dmochowski, Pawel A. et al. "Frequency Domain Equalization for High Data Rate Multipath Channels." 2001 IEEE Pacific Rim Conference On Communications, Computers and Signal Processing; Aug. 26, 2001; pp. 534-537.

(Continued)

Primary Examiner—Emmanuel Bayard
(74) Attorney, Agent, or Firm—Harness, Dickey & Pierce

(57) ABSTRACT

The method of receiver processing of CDMA signals in a CDMA system includes first converting a received signal in the time domain to a received signal in the frequency domain, and equalizing the received signal in the frequency domain using a set of frequency domain weights. The equalized received signal in the frequency domain is converted to an equalized received signal in the time domain. The set of frequency domain weights are adaptively adjusted at a symbol rate of the received signal in the time domain based on an error signal produced from the received signal in the frequency domain and a frequency domain representation of a known pilot signal of the CDMA system.

14 Claims, 2 Drawing Sheets

OTHER PUBLICATIONS

Clark, Martin V. "Adaptive Frequency-Domain Equalization and Diversity Combining for Broadband Wireless Communications." Vehicular Technology Conference, 1998. IEEE, May 18, 1998; pp. 409-413.

Burg, A. et al. "Practical Low Complexity Linear Equalization for MIMO-CDMA Systems." Conference Record of the $37^{th}$ Asilomar Conference on Signals, Systems and Computers; Nov. 9, 2003; pp. 1266-1272.

Mailaender, Laurence. Adaptive Frequency-Domain Chip Equalization for the MIMO CDMA Downlink. Vehicular Technology Conference; Sep. 26, 2004; pp. 1766-1770.

European Search Report dated Oct. 4, 2005.

Ghauri, Irfan et al. "Linear Receivers for the DS-CDMA Downlink Exploiting Orthogonality of Spreading Sequences." IEEE 1998, pp. 650-653.

Frank, Colin D. et al. "Adaptive Interference Suppression for Direct-Sequence CDMA Systems with Long Spreading Codes." Proc. Of $36^{th}$ Allerton Conference, Sep. 1998, pp. 411-419.

Krauss, Thomas P., et al. "MMSE Equalization for Forward Link in 3G CDMA: Symbol-Level Versus Chip-Level." *IEEE*, 2000, pp. 18-22.

Petre, Frederik, et al. "Pilot-aided Adaptive Chip Equalizer Receiver for Interference Suppression in DS-CDMA Forward Link." *IEEE*, 2000, pp. 303-308.

Mailaender, Laurence. "Linear MIMO Chip Equalization for the CDMA Downlink." Proc. Of IEEE Signal Processing Advances in Wireless Communications, Rome, Italy, 2003.

Shynk, John J. "Frequency-Domain and Multirate Adaptive Filtering." *IEEE SP Magazine*, Jan. 1992, pp. 14-37.

Mansour, David et al. "Unconstrained Frequency-Domain Adaptive Filter." *IEEE*, 1982, pp. 726-734.

Clark, Gregory A. et al. "A Unified Approach to Time- and Frequency-Domain Realization of FIR Adaptive Digital Filters." *IEEE Transactions On Acoustics, Speech, and Signal Processing*, vol. ASSP-31, No. 5, Oct. 1983, pp. 1073-1083.

Lee, Jae Chon. "Performance of Transform-Domain LMS Adaptive Digital Filters." *IEEE Transactions On Acoustics, Speech, and Signal Processing*, vol. ASSP-34, No. 3, Jun. 1986, pp. 499-510.

Burg, A., et al. "Low Complexity Frequency Domain Equalization of MIMO Channels with Applications to MIMO-CDMA Systems." *IEEE*, 2003, pp. 468-472.

\* cited by examiner

METHOD OF RECEIVER PROCESSING OF CDMA SIGNALS IN A CDMA SYSTEM

BACKGROUND OF THE INVENTION

In the code-division multiple access (CDMA) downlink (base station to mobile station communication link), equalization can restore the orthogonality lost in multipath channels, and exceed the performance attained by a Rake receiver. For practical implementation of the equalizers, two forms of an adaptive least-mean-square (LMS) algorithm have been proposed. Both forms operate on the individual received chips, however, the straightforward LMS algorithm updates the weights at every chip time, whereas the second approach (called "LMS-G") performs an extra correlation at the equalizer output and updates the weights at the symbol rate. It has also been shown that with careful adjustment of the LMS step size, $\mu$, the LMS-G algorithm is superior for both SISO (single input single output) and MIMO (multiple input multiple output) equalizers.

Unfortunately, the adaptive algorithms have fairly high complexity in the MIMO case, due to the large number (M N) of parallel filters required (where M is the number of transmit antennas and N the number of receive antennas in the MIMO system). The convergence time of the LMS-G algorithm for the channels of interest is 3 msec (for a 4×4 equalizer on the TU (Typical Urban) channel) which restricts its use to slowly moving mobile terminals.

Application of LMS algorithm in the frequency domain for a SISO TDMA (time division multiple access) system has also been proposed. This so-called FLMS (frequency LMS) algorithm operates in a block mode, using either overlap-add or overlap-save to perform the time domain linear convolutions. FLMS can be both less complex than ordinary LMS and offer faster convergence when an individual step-size is chosen for each frequency bin. The so-called TLMS (transform domain LMS) algorithms operate in a sample-by-sample mode and have substantially greater complexity than FLMS.

SUMMARY OF THE INVENTION

According to the present invention, the block mode FLMS algorithm using overlap-save has been adapted for use in a CDMA system by extending the algorithm to include an extra correlator on the pilot code or signal. This new algorithm may be referred to as FLMS-G. Namely, the FLMS algorithm is trained and converged using the known pilot signal of the CDMA system. This permits adaptive adjustment of the FLMS set of frequency domain weights at the symbol rate of the equalized signal. Additionally, according to the present invention, the new FLMS-G is further modified for application to MIMO transmission and reception.

The present invention further provides a significant reduction in convergence time, particularly, for MIMO equalizers when the step size matrix of the FLMS algorithm is generalized to include terms corresponding to the spatial cross-spectrums.

According to one embodiment of the present invention, a method of receiver processing of CDMA signals in a CDMA system includes first converting a received signal in the time domain to a received signal in the frequency domain, and equalizing the received signal in the frequency domain using a set of frequency domain weights. The equalized received signal in the frequency domain is converted to an equalized received signal in the time domain. The set of frequency domain weights are adaptively adjusted at a symbol rate of the received signal in the time domain based on an error signal produced from the received signal in the frequency domain and a frequency domain representation of a known pilot signal of the CDMA system.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
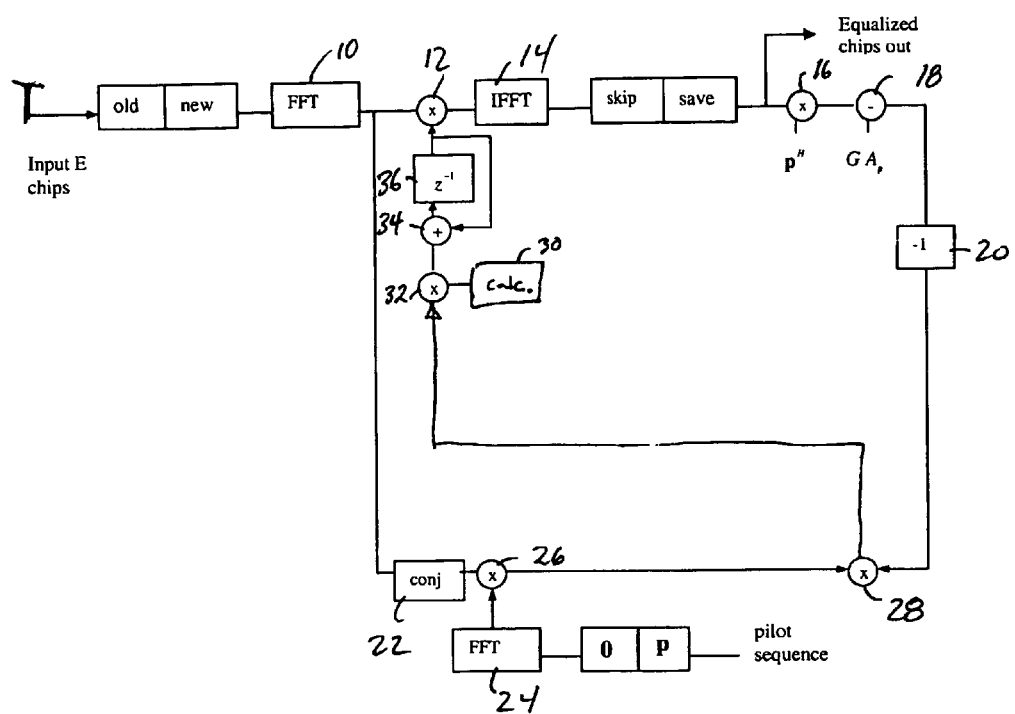
FIG. 1 illustrates a single-input single-output implementation of the method of receiver processing of CDMA signals according to an embodiment of the present invention.

To better understand the present invention, the time domain version of the LMS-G algorithm will be reviewed, followed by an explanation of the derivation for the FLMS-G algorithm according to the present invention. Then SISO and MIMO equalizer implementations of the new FLMS-G algorithm according to the present invention will be described.

Review of LMS-G Algorithm

As discussed above, a time domain chip-level equalizer followed by an additional pilot-channel correlator, which updates at the symbol rate, has been proposed. This LMS-G algorithm has also been used for the MIMO CDMA case with code re-use across antennas. In this section, this (time-domain) LMS-G algorithm, for SISO and for MIMO channels, will be briefly reviewed.

The equalizer output the k-th chip is $y_k = r_k^T w_j$, where $r_k$ is the received vector and $w_j$ the equalizer weight vector as expressed below, $$r_k = [r(k-E+1), \ldots, r(k-1), r(k)]^T$$

$$w_j = [w(0), w(1), \ldots, w(E-1)]^T \quad (2.1)$$

and where the equalizer length is E chips. Note that j is an index for the equalizer updates, which occurs at a multiple of the symbol rate, $j = \lfloor (k+1)/(BG) \rfloor$, where G is the number of chips per symbol, and B is the number of pilot symbols per update. For simplicity, assume E=BG.

The equalizer output is despread with B consecutive pilot symbols. The despreader output at time j is $a_j = p_j^H R_j w_j$, where $$p_j = [p(k-d), p(k-d+1), \ldots, p(k-d+BG-1)]^T$$

$$R_j = [r_{k+BG-1} \, r_{k+BG-2} \cdots r_{k+BG-E}]_{BG \times E} \quad (2.2)$$

Here, p(k) denotes the pilot chip at time k, and $0 \leq d \leq E-1$ is a delay that a system designer is free to choose. The error at the j-th update is defined as, $$e_j = a_j - BGA_p \quad 2.21$$

where $A_p$ is the amplitude of the pilot signal. Defining the cost function $J = \|e_j\|^2$ and taking the derivative w.r.t. $w_j$, the LMS-G algorithm is derived as, $$w_{j-1} = w_j + \mu R_j^H p_j [GA_p - a_j] \quad (2.3)$$

where $\mu$ is the (scalar) LMS step-size.

This basic procedure can be extended to MIMO channels. A separate equalizer is used for each of the M transmitters (nothing is gained by a "joint" procedure that uses all M pilots simultaneously). The N FIR filters (one per receive antenna) making the equalizer are, $$w_j = [w_{m,1}^T, w_{m,2}^T, \ldots, w_{m,N}^T]$$

whose subcomponents are analogous to equation (2.1). Then the received signal is grouped into, $$R_j = [R_{1,j}, R_{2,j}, \ldots, R_{N,j}]$$

where each subcomponent is analogous to equation (2.2) for each receive antenna. The MIMO LMS-G algorithm is again given by (2.3), where the m-th pilot signal is used in $p_j$.

Derivation of FLMA-G Algorithm

To derive the new FLMS-G procedure according to the present invention for SISO channels, note that the terms $R_j^H p_j$ and $R_j w_j$ correspond to linear convolutions, which may be converted to circular convolutions by "embedding" them in circulant matrices, e.g., $$C \triangleq \begin{bmatrix} r(k+BG-2E) & r(k+BG-2E-1) & \ldots & r(k+BG-2E+1) \\ \vdots & r(k+BG-2E) & \ddots & r(k+BG-2E+2) \\ r(k-1) & \vdots & \ddots & \ddots & \ddots \\ r(k) & r(k-1) & \ddots & \ddots & \ddots \\ \vdots & r(k) & \ddots & \ddots & r(k+BG-1) \\ r(k+BG-1) & \vdots & \ddots & \ddots & r(k+BG-2E) \end{bmatrix} \quad (3.1)$$

The lower left quadrant of this circulant matrix is identical to $R_j$ in equation (2.2). The last row of matrix C is obtained from $R_j$ beginning in the lower left corner and moving right along the last row, collecting samples in reverse-time order until reaching $r(k+BG-2E)$. Each higher row of C is the left circular shift of the preceding row. These linear convolutions may be efficiently implemented by taking the FFT of the first column C (denoted $c_1$) and computing, $$IFFT\left\{FFT\{[c_1]\} \odot FFT\left\{\begin{bmatrix} w \\ 0 \end{bmatrix}\right\}\right\} = \begin{bmatrix} \text{skip} \\ \text{save} \end{bmatrix} \quad (3.2)$$

The symbol $\odot$ denotes "element-by-element" multiplication. The "save" output of equation (3.2) corresponds to $R_j w_j$. Similar reasoning gives an expression for $R_j^H p_j$, however, it is necessary to take the conjugate of the result.

For frequency-domain equalization according to the present invention, the scalar step-size, $\mu$, in equation (2.3) may be generalized to a diagonal matrix $D_j$ whose elements are computed adaptively as, $$D_j = \mu P_j^{-1}$$

$$P_j = (1-\beta)P_{j-1} + \beta \text{diag}(|FFT\{r_{j-1}\}|^2) \quad (3.3)$$

where diag (•) denotes a diagonal matrix, the norm is taken per-element, and $\beta$ is a forgetting factor set by the system designer based on empirical study (e.g., the forgetting factor may have a value of 0.05). This generalization is responsible for the improved convergence speed of FLMS-G.

According to one exemplary embodiment, FLMS-G receiver processing of CDMA signals according to the present invention includes the steps of:

1) Get new (non-overlapping) input vector, $r_j$.

2) $y_j = \begin{bmatrix} r_{j-1} \\ r_j \end{bmatrix}$

3) $\bar{y}_j = \text{FFT}(y_j)$

4) $\bar{z}_j = \bar{y}_j \odot \bar{w}_j$

5) $z_j' = \text{IFFT}(\bar{z}_j)$, and $z_j = z_j'(E+1:2E)$

6) $e_j = GA_p - \langle p_j, z_j \rangle$

7) $p_k' = \begin{bmatrix} 0_{E \times 1} \\ p_k \end{bmatrix}$

8) $\bar{g}_j = e_j(\text{conj}(\bar{y})_j \odot \text{FFT}(p_j'))$

10) $D_j = \mu P_j^{-1}$, $P_j = (1-\beta)P_{j-1} + \beta \text{diag}(|\bar{y}_k|^2)$ 11) $\bar{w}_{j+1} = \bar{w}_j + D_j \bar{g}_j$ 12) next j, go to 1).

The FLMS-G receiver processing method described above requires 3 FFT operations per update (each of length 2E).

The extension to MIMO is straightforward, as was shown above for LMS-G. A beneficial simplification results from summing the spatial filters in the frequency-domain, drastically reducing the number of IFFTs needed. Following equation (3.3), the MIMO step size matrix is diagonal, with elements that correspond to the power spectrum of the signals received on each of the N antennas. This will be described in detail in the next section below.

Improvement Using Cross-Spectrum

By analogy to the recursive-least-squares (RLS) algorithm, we can see that the "optimal" step size matrix is the inverse of the complete covariance matrix, $R_{opt} = E\{\bar{y}\bar{y}^H\}$, $\bar{y} = [\bar{y}_1^T, \ldots, \bar{y}_N^T]^T$, and this may be approximated by taking only the diagonal elements so the resulting matrix is easy to invert. In the previous sections, the subscript index represented a time index. However, in this section and the equation given below, the subscript index represent an index on the number of receive antennas N. A better approximation results if the cross-spectrum terms are also included, leading to an über-matrix of diagonal matrices as shown in equation 4.1 below.

$$\ddot{U}D = \begin{bmatrix} P_{1,1} & P_{1,2} & \ldots & P_{1,N} \\ P_{1,2}^* & P_{2,2} & & \\ & & \ddots & \vdots \\ P_{1,2}^* & P_{2,N}^* & \ldots & P_{N,N} \end{bmatrix} \quad (4.1)$$

$$P_{i,n}(j+1) = (1-\beta) P_{i,n}(j) + \beta \text{diag}(\bar{y}_i \odot \bar{y}_n)$$

where N is the number of receive antennas and indices i and n each index a particular receive antenna.

The improved step size matrix is then $D=\mu(\ddot{U}D)^{-1}$. The structure of the ÜD matrix makes it easy to invert.

SISO Implementation of FLMS-G

Next, a SISO implementation of FLMS-G will be described with respect to FIG. 1. For purposes of explanation, the same variables as used in the above described equations will be used in this description. As shown, E new chips $r_j$ and E old chips $r_{j-1}$ of a signal received over an antenna (represented as $$y_j = \begin{bmatrix} r_{j-1} \\ r_j \end{bmatrix})$$

are converted to the frequency domain by a first converter 10. A first multiplier 12 obtains the product $\bar{z}_j$ between the received signal $\bar{y}_j$ in the frequency domain and the set of frequency domain weights $\bar{w}_j$ to produce the equalized received signal in the frequency domain.

A second converter 14 converts the signal $\bar{z}_j$ to the time domain. A second of the E chips in the time domain dot product serve as the equalized received signal that is output by the equalizer. The inner product or dot product of this equalized received signal and the chips of the known pilot signal for the CDMA system is obtained by a second multiplier 16. The output of the second multiplier 16 results in an estimate of a pilot symbol amplitude from the equalized received signal in the time domain.

A subtractor 18 subtracts the amplitude of the pilot signal $GA_p$ from the output of the second multiplier 16. An inverter 20 inverts the output of the subtractor 18 to produce a scalar that represents a difference in amplitude between the estimated pilot symbol amplitude and a known amplitude of the known pilot signal in the CDMA system.

A third converter 22 obtains the conjugate of the output from the first converter 10, and a fourth converter 24 converts E zero chips and E chips of the known pilot signal to the frequency domain. A third multiplier 26 mixes this frequency domain version of the pilot signal with the conjugate of the output from the first converter 10. The resulting output indicates a direction of an error in the equalization. The output of the inverter 20 provides the magnitude of this error. A fourth multiplier 28 combines the two to obtain the error signal $\bar{g}_j$.

A step matrix calculator 30 generates the diagonal matrix $D_j$ according to equation 3.3. A fifth multiplier 32 multiplies this diagonal matrix and error signal. This affects the error signal per tone (i.e., frequency), so that the error signal from weak tones may be boosted. An adder 34 adds the output of the fifth multiplier 32 and output of the fifth multiplier delayed by a delay 36 to generate the set of frequency domain weights.

MIMO Implementation of FLMS-G

Figure 2:
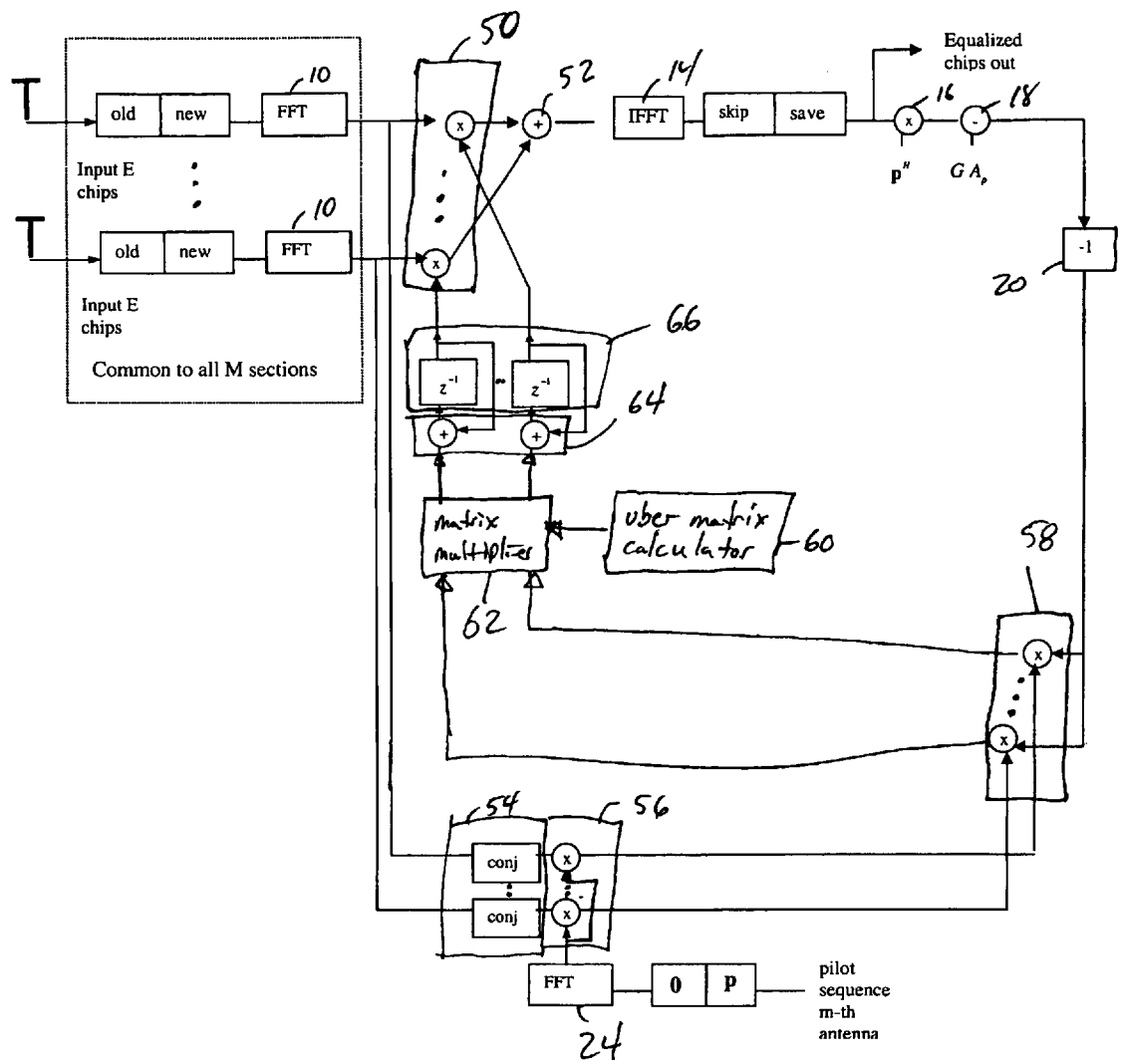
FIG. 2 illustrates a multiple-input multiple-output implementation of the method of receiver processing of CDMA signals according to an embodiment of the present invention.

Next, a MIMO implementation of FLMS-G will be described with respect to FIG. 2. It will be understood that a MIMO system involves transmission of a plurality, M, of signals from one location using multiple transmit antennas, and receipt of these signals using a plurality of receive antennas at a second location. A MIMO system includes a pilot signal for each of the M transmit antennas. FIG. 2 illustrates the structure for receiver processing using one of the pilot signals. As will be appreciated, the structure for converting the received signals to the frequency domain is common for each pilot signal, and the structure for generating and applying the sets of frequency domain weights is duplicated for each of the respective pilot signals. This latter structure also generates equalized output associated with each transmitted signal. Namely, the M equalized outputs have been temporally corrected and spatially separated by this structure to approximate the M transmitted signals.

The structure for generating and applying the sets of frequency domain weights includes a first set of multipliers 50. Each multiplier in the first set of multipliers 50 multiplies a respective one of the received signals in the frequency domain by a respective set of frequency domain weights. An adder 52 adds the output of each multiplier in the first set of multipliers 50. From the output of the adder 52, the equalized received signal and the magnitude of the error signal are produced in the same manner described above with respect to FIG. 1.

Each converter in a set of converters 54 obtains the conjugate of a respective received signal in the frequency domain, and a converter 24 converts E zero chips and E chips of the pilot signal associated with this structure to the frequency domain (in this case the pilot signal of the mth transmit antenna). A second set of multipliers 56 mixes this frequency domain version of the pilot signal with each conjugate of the output from the set of converters 54. The resulting outputs each indicate a direction of an error in the equalization. The output of the inverter 20 provides the magnitude of this error. Each multiplier in a third set of multipliers 58 combines the output from a respective one of the third set of multipliers 56 and the output of the inverter 20 to generate an error signal.

An uber matrix calculator 60 generates a set of power-spectra and cross-power spectra are generated by multiplying all pairs of received frequency-domain inputs and talking time averages (see eqn 4.1). The individual spectra are arranged as diagonal matrices, and then an "uber-diagonal" matrix is formed. The uber matrix calculator 60 produces the inverse of the uber-diagonal matrix as the step-size matrix, applies this to a matrix multiplier 62. The matrix multiplier 62 performs matrix multiplication between the step size matrix and the respective error signals. This affects each error signals per tone (i.e., frequency), so that the error signal from weak tones may be boosted. As will be appreciated, the matrix multiplication produces an output vector for each error signal. Each adder in a set of adders 64 adds a respective output from the matrix multiplier 62 and the respective output of the matrix multiplier 62 delayed by a respective delay in a set of delays 66 to generate a set of frequency domain weights.

The method and apparatuses according to the present invention significantly reduce the complexity of the equalization process by performing operations in the frequency domain. This is particularly true with a MIMO CDMA system. Furthermore, the uber-diagonal matrix of the present invention provides for improved convergence time, again particularly with a MIMO CDMA system.

The invention being thus described, it will be obvious that the same may be varied in many ways. For example, using FFT operations of length 2E chips and performing the skip/save operation may not be strictly necessary. Instead, only the current E chips of the received signal may be used (with a corresponding decrease in the number of chips in the other operations as well). Such variations are not to be regarded as a departure from the invention, and all such modifications are intended to be included within the scope of the invention.

I claim:

1. A method of receiver processing of CDMA signals in a CDMA system, comprising:
   first converting, by at least one receiver, a received signal in the time domain to a received signal in the frequency domain;

adaptively adjusting frequency domain weights based on an error signal produced from the received signal in the frequency domain and a frequency domain representation of a known pilot signal of the CDMA system, at a symbol rate of the received signal in the time domain;

equalizing the received signal in the frequency domain using the set of adaptively adjusted frequency domain weights; and second converting the equalized received signal in the frequency domain to an equalized received signal in the time domain;

wherein the adaptively adjusting step includes,
generating the error signal in the frequency domain to represent a difference of the equalized received signal from the known pilot signal.

2. The method of claim 1, wherein the adaptively adjusting further comprises:
applying a step size matrix to the error signal to generate the set of frequency domain weights, the step size matrix providing a respective amount to adjust each weight of the set of frequency domain weights based on a spectrum of received signal in the frequency domain.

3. The method of claim 2, wherein the generating comprises:
estimating a pilot symbol amplitude from the equalized received signal in the time domain;
determining a difference in amplitude between the estimated pilot symbol amplitude and a known amplitude of the known pilot signal as an error magnitude;
multiplying the received signal in the frequency domain by the known pilot signal in the frequency domain to obtain an error direction; and
multiplying the error magnitude and the error direction to obtain the error signal.

4. The method of claim 3, further comprising:
determining the step size matrix according to the following expression, $$D_j = \mu P_j^{-1}$$

$$P_j = (1-\beta)P_{j-1} + \beta \text{diag}(|FFT\{r_{j-1}\}|^2)$$

where r is the received signal in the time domain, diag (•) denotes a diagonal matrix, and β is a forgetting factor constant.

5. The method of claim 2, further comprising:
determining the step size matrix according to the following expression, $$D_j = \mu P_j^{-1}$$

$$P_j = (1-\beta)P_{j-1} + \beta \text{diag}(|FFT\{r_{j-1}\}|^2)$$

where r is the received signal in the time domain, diag (•) denotes a diagonal matrix, and β is a forgetting factor constant.

6. The method of claim 1, wherein
first converting converts a vector yj of a received signal rj and the previous received signal rj−1 where $$y_j = \begin{bmatrix} r_{j-1} \\ r_j \end{bmatrix},$$

each of the received signal rj and the previous received signal rj−1 having E elements;

the equalizing calculates a product of the vector yj and the set of weights to the second converting converts a second E of the 2E elements in the vector z to the time domain.

7. The method of claim 6, wherein the adaptively adjusting comprises:
generating the error signal $\bar{g}_j$ in the frequency domain to represent the difference of the equalized received signal from the known pilot signal according to the following expression, $$\bar{g}_j = e_j(conj(\bar{y})_j \odot FFT(p'_j))$$

where $$e_j = GA_p - \langle p_j, z_j \rangle,$$

$$p'_k = \begin{bmatrix} 0_{E \times 1} \\ p_k \end{bmatrix},$$

and $p_k$ represents the known pilot signal, $\langle p_j, z_j \rangle$ represents the conventional dot product or an accumulation of chips for one symbol in the equalized received signal in the time domain, and $GA_p$ represents a magnitude of the known pilot signal; and applying a step size matrix Dj to the error signal to generate the set of frequency domain weights, the step size matrix providing a respective amount to adjust each weight of the set of frequency domain weights based on a spectrum of received signal in the frequency domain.

8. The method of claim 7, further comprising:
determining the step size matrix Dj according to the following expression, $$D_j = \mu P_j^{-1}$$

$$P_j = (1-\beta)P_{j-1} + \beta \text{diag}(|FFT\{r_{j-1}\}|^2)$$

where r is the received signal in the time domain, diag (•) denotes a diagonal matrix, and β is a forgetting factor constant.

9. The method of claim 1, wherein
the CDMA system is a multiple-input multiple-output (MIMO) CDMA system having a known pilot signal associated with each transmit antenna;
the first converting converts a plurality of received signals in the time domain to received signals in the frequency domain; and for each known pilot signal,
the equalizing equalizes the received signals in the frequency domain using a set of frequency domain weights associated with each received signal; and the method further includes,
combining the equalized received signals; and wherein
the second converting converts the combined equalized received signal in the frequency domain to a combined equalized received signal in the time domain; and
the adaptively adjusting adaptively adjusts the set of frequency domain weights associated with each received signal at a symbol rate of the received signal in the time domain based on an error signal produced from the received signal in the frequency domain and a frequency domain representation of the known pilot signal.

10. The method of claim 9, wherein, for each known pilot signal, the adaptively adjusting comprises:
generating the error signal associated with each received signal; and
applying a step size matrix to the error signal to generate the set of frequency domain weights, the step size matrix providing a respective amount to adjust each weight of the set of frequency domain weights based on a spectrum of received signal in the frequency domain.

11. The method of claim 10, wherein the applying comprises:

determining the step size matrix D as, $$D = \mu(\ddot{U}D)^{-1},$$

where $$\ddot{U}D = \begin{bmatrix} P_{1,1} & P_{1,2} & \cdots & P_{1,N} \\ P^*_{1,2} & P_{2,2} & & \\ & & \ddots & \vdots \\ P^*_{1,2} & P^*_{2,N} & \cdots & p_{N,N} \end{bmatrix}$$

$$P_{i,n}(j+1) = (1-\beta)P_{i,n}(j) + \beta diag\,(\bar{y}_i \odot \bar{y}_n)$$

where N is the number of receive antennas, indices i and n each index a particular receive antenna, for an antenna j, $$\bar{y}_j = FFT(y_j), \quad y_j = \begin{bmatrix} r_{j-1} \\ r_j \end{bmatrix}$$

$r_j$ is a current received signal in the time domain and $r_{j-1}$ is a previous received signal in the time domain, diag (•) denotes a diagonal matrix, and $\beta$ is a forgetting factor constant.

12. A method of receiver processing of CDMA signals in a CDMA system, comprising:

applying, by at least one receiver, an LMS (least mean squares) algorithm to a received CDMA signal in the frequency domain where weights of the LMS algorithm are updated in the frequency domain based on an error signal at a symbol rate of the received CDMA signal, wherein the error signal is generated in the frequency domain to represent a difference of an equalized received signal from a known pilot signal of the CDMA system.

13. The method of claim 12, wherein the applying [step] applies the LMS algorithm trained using the known pilot signal.

14. The method of claim 12, wherein a step size adjustment of the LMS algorithm is preformed using step size matrix providing a respective amount to adjust each weight of the set of frequency domain weights based on a spectrum of received signal in the frequency domain.

* * * * *

UNITED STATES PATENT AND TRADEMARK OFFICE
CERTIFICATE OF CORRECTION

PATENT NO. : 7,660,340 B2
APPLICATION NO. : 10/872359
DATED : February 9, 2010
INVENTOR(S) : Laurence Mailaender It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1605 days.

Signed and Sealed this

Twenty-eighth Day of December, 2010

David J. Kappos
*Director of the United States Patent and Trademark Office*